US011714153B2

(12) United States Patent
Harvey et al.

(10) Patent No.: US 11,714,153 B2
(45) Date of Patent: Aug. 1, 2023

(54) REMOTE CONTROLLED NAVIGATION/LOCATOR BEACON SYSTEM

(71) Applicant: Rugged Nature LLC, Diamondhead, MS (US)

(72) Inventors: Craig Harvey, Diamondhead, MS (US); Scott Dow, Diamondhead, MS (US); Joel Lawhead, Diamondhead, MS (US); Amy M. Fletcher, Diamondhead, MS (US)

(73) Assignee: NVISION SOLUTIONS, INC., Diamondhead, MS (US)

( * ) Notice: Subject to any disclaimer, the term of this patent is extended or adjusted under 35 U.S.C. 154(b) by 346 days.

(21) Appl. No.: 16/887,663

(22) Filed: May 29, 2020

(65) Prior Publication Data

US 2020/0379076 A1 Dec. 3, 2020

Related U.S. Application Data

(60) Provisional application No. 62/854,154, filed on May 29, 2019.

(51) Int. Cl.
*G01S 1/70* (2006.01)
*G01C 21/20* (2006.01)

(52) U.S. Cl.
CPC ........... *G01S 1/7038* (2019.08); *G01C 21/20* (2013.01)

(58) Field of Classification Search
CPC ..... G01S 1/7038; G01C 21/20; H04B 5/0062; H04B 10/1123; H04B 10/502; H04B 10/116; H04B 10/40; H04B 1/385; H04B 10/11; H04B 3/54; H04W 12/50; H04W 4/029; H04W 4/025; H05B 47/195; G08B 13/19663; G08B 13/19613

USPC .......................... 398/118, 128, 130, 57, 135
See application file for complete search history.

(56) References Cited

U.S. PATENT DOCUMENTS

| 5,198,798 | A  | 3/1993  | Lietzow |
| 7,045,828 | B2 | 5/2006  | Shimizu |
| 7,625,101 | B2 | 12/2009 | Alessio |
| 8,096,674 | B2 | 1/2012  | Matthews |
| 8,330,387 | B2 | 12/2012 | York |
| 8,358,064 | B2 | 1/2013  | Seaman |

(Continued)

OTHER PUBLICATIONS

Amazon.com, "TrailBeacon LED Trail Markers," Web page, <URL: https://www.amazon.com/TrailBeacon-LED-Trail-Markers/dp/B00QUPC7S2/>, Published online Dec. 11, 2014, Retrieved from the Internet Jan. 13, 2021 (3 pages).

*Primary Examiner* — Hibret A Woldekidan

(57) ABSTRACT

A path finding system using a series of networked receiver beacons is disclosed. The system includes receiver beacons placed on a path. Each of the receiver beacons include a transceiver receiving and sending signals and a location indicator such as a LED, that when activated indicates the location of the receiver beacon. Each of the receiver beacons include a controller coupled to the indicator and the transceiver. The controller is operable to receive an activation signal to activate the indicator. A transmitter is paired with each of the receiver beacons. The transmitter includes a transceiver to send an activation signal to at least one of the receiver beacons. The receiver beacon receives the activation signal and activates the indicator. The receiver beacon also relays the activation signal to at least another receiver beacon.

20 Claims, 12 Drawing Sheets

(56) References Cited

U.S. PATENT DOCUMENTS

| | | | |
|---|---|---|---|
| 8,981,916 B2 | 3/2015 | Kleve | |
| 9,101,190 B2 | 8/2015 | Noble | |
| 9,194,568 B2 | 11/2015 | Moriyama | |
| 9,395,068 B2 | 7/2016 | Song | |
| 9,447,938 B2 | 9/2016 | Li | |
| 9,458,995 B1 | 10/2016 | Pearson | |
| 9,573,512 B2 | 2/2017 | Kumar | |
| 9,900,556 B1 * | 2/2018 | Scanlon | H04M 3/567 |
| RE46,991 E | 8/2018 | Hildebrant | |
| 10,123,401 B2 | 11/2018 | Lin | |
| 10,189,400 B2 | 1/2019 | Danowski | |
| 10,201,044 B2 | 2/2019 | Rodriguez | |
| 10,215,331 B2 | 2/2019 | Sharrah | |
| 10,337,715 B2 | 7/2019 | Tsai | |
| 10,443,798 B1 | 10/2019 | Tan | |
| 10,494,780 B2 | 12/2019 | Koyle | |
| 10,607,491 B2 | 3/2020 | Matthiesen | |
| 10,642,097 B2 | 5/2020 | Kumamoto | |
| 10,647,289 B2 | 5/2020 | McNabb | |
| 10,655,801 B2 | 5/2020 | Lee | |
| 10,674,577 B2 | 6/2020 | Yamakawa | |
| 10,690,961 B2 | 6/2020 | Kishimoto | |
| 10,697,596 B2 | 6/2020 | Mullen | |
| 10,772,302 B2 | 9/2020 | Lutz | |
| 10,775,029 B2 | 9/2020 | Sousa | |
| 10,794,548 B2 | 10/2020 | Powell | |
| 10,805,999 B2 | 10/2020 | Alexander | |
| 2006/0023454 A1 | 2/2006 | Koren | |
| 2012/0250336 A1 | 10/2012 | Chartrand | |
| 2013/0242103 A1 | 9/2013 | Schraga | |
| 2013/0336090 A1 | 12/2013 | Tran | |
| 2015/0116110 A1 * | 4/2015 | Schuman | G08B 29/188 340/517 |
| 2015/0280316 A1 | 10/2015 | Iso | |
| 2016/0076717 A1 | 3/2016 | Magner | |
| 2016/0309570 A1 | 10/2016 | Han | |
| 2017/0086273 A1 | 3/2017 | Soler | |
| 2017/0240255 A1 | 8/2017 | Waldrop | |
| 2017/0316660 A1 | 11/2017 | Chong | |
| 2017/0332741 A1 | 11/2017 | Chun | |
| 2018/0135817 A1 | 5/2018 | Germain | |
| 2019/0021156 A1 | 1/2019 | Julian | |
| 2019/0193626 A1 | 6/2019 | Park | |
| 2019/0210616 A1 | 7/2019 | Watkins | |
| 2019/0360649 A1 | 11/2019 | Puffer | |
| 2020/0290509 A1 | 9/2020 | Pandit | |

* cited by examiner

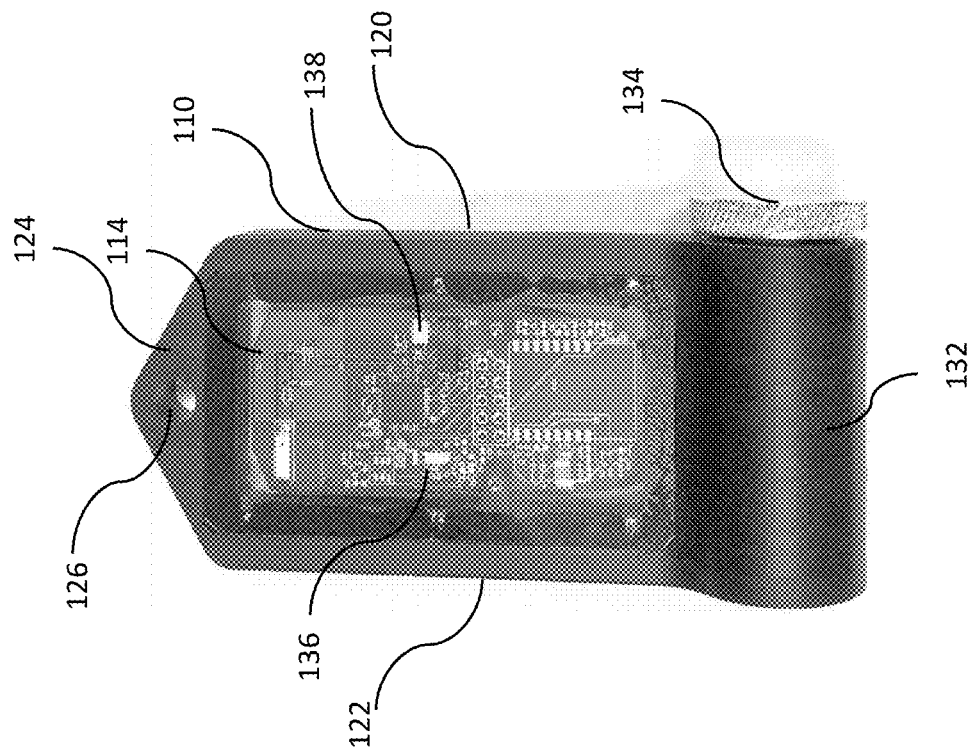
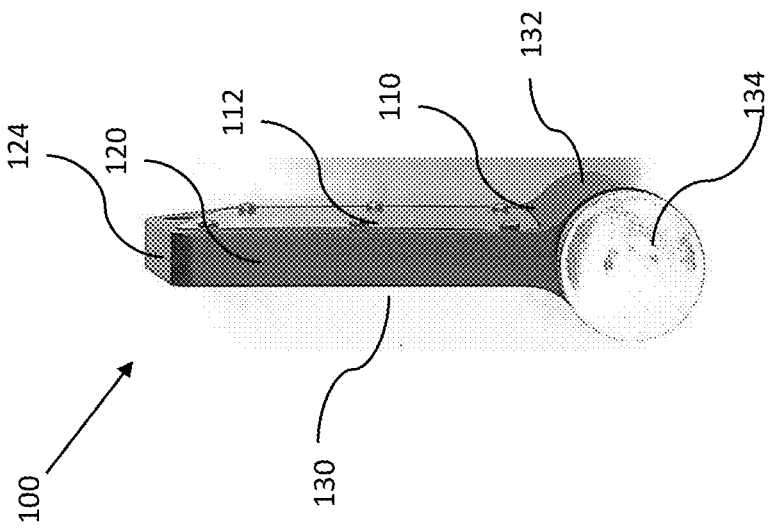

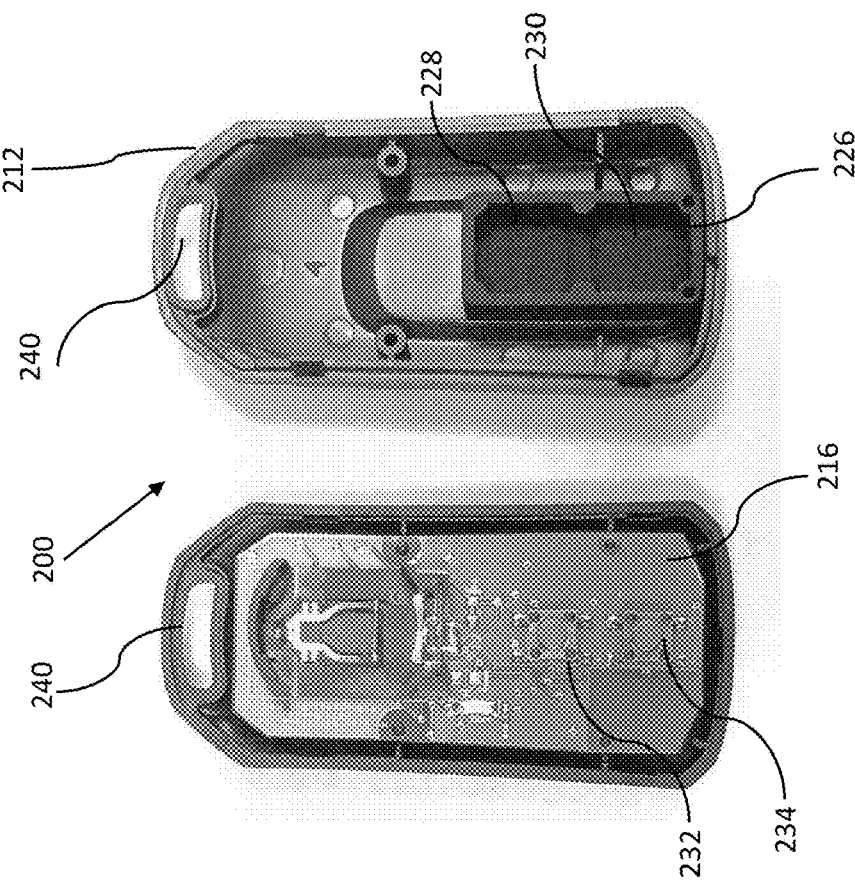
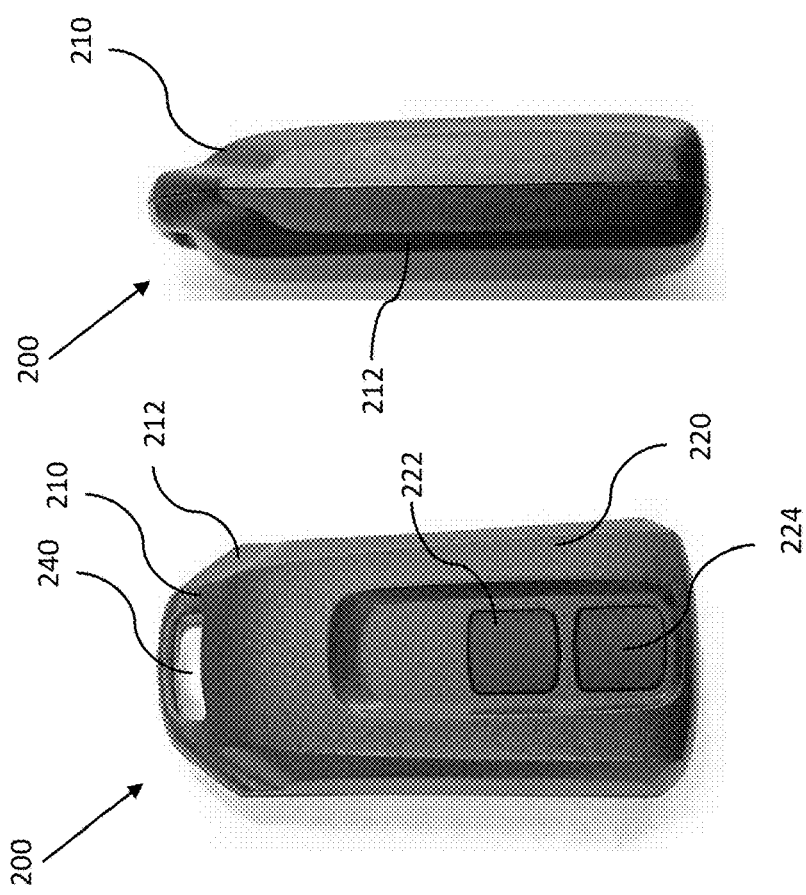

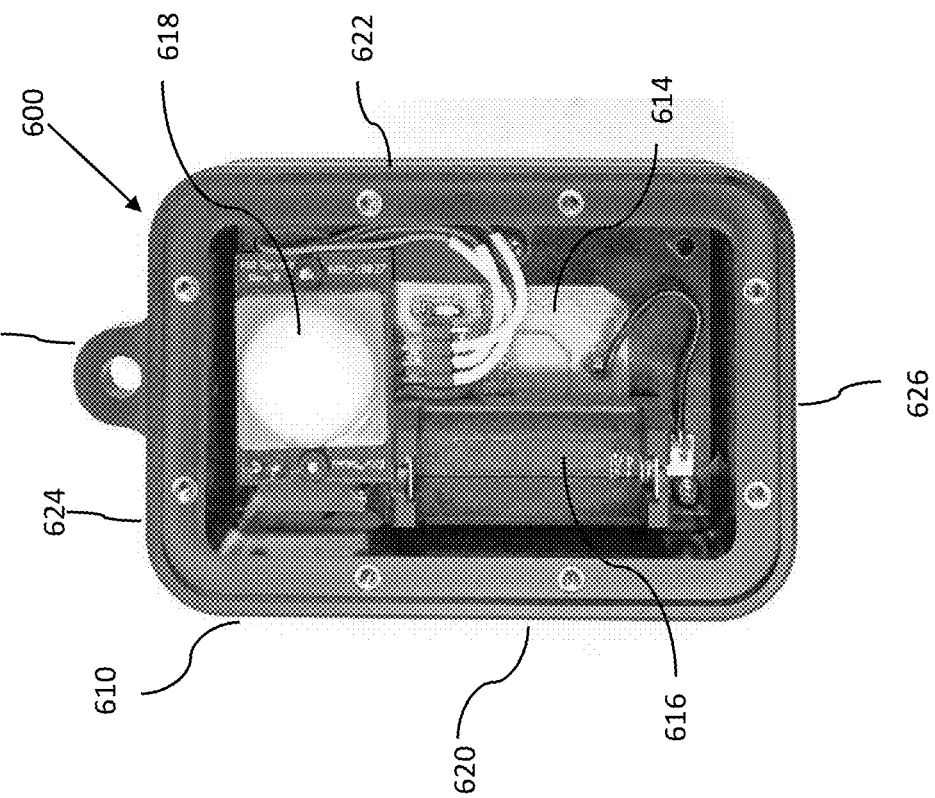
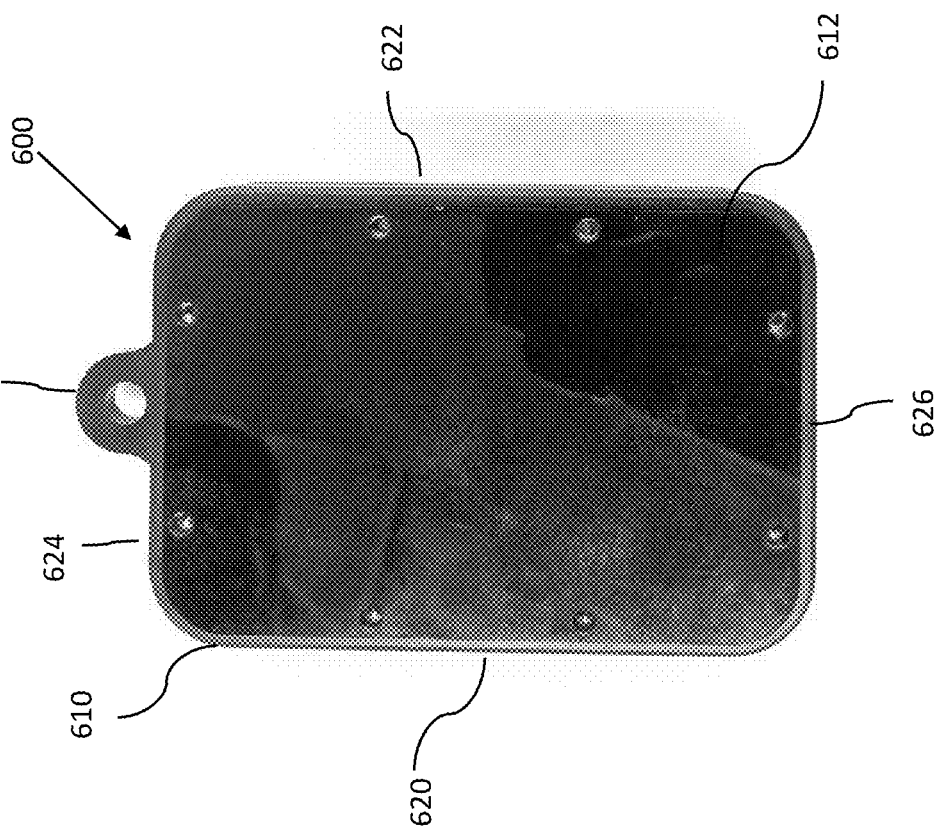

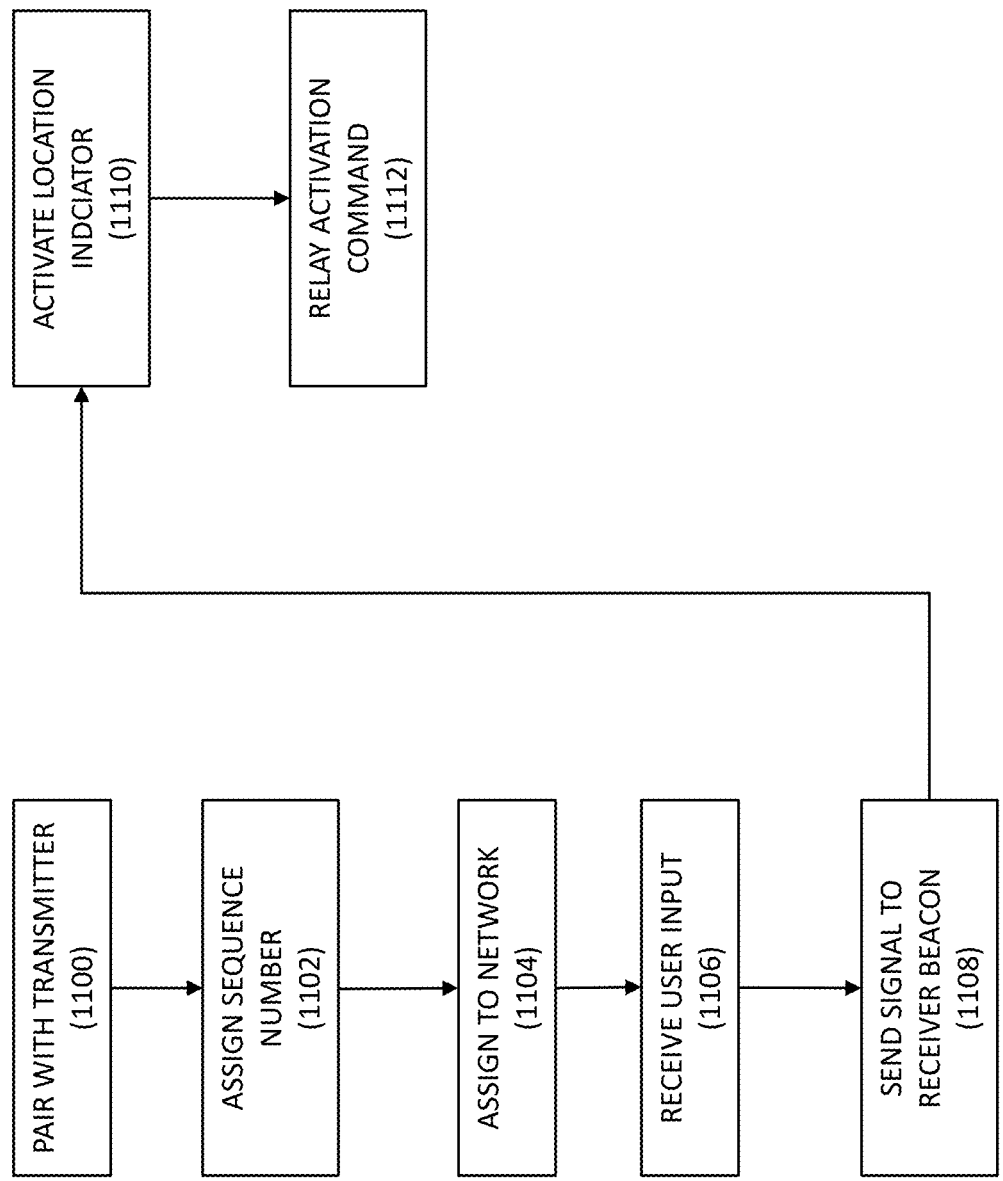

REMOTE CONTROLLED NAVIGATION/LOCATOR BEACON SYSTEM

CROSS-REFERENCE TO RELATED APPLICATIONS

This patent application claims the benefit of U.S. Provisional Patent Application No. 62/854,154, filed May 29, 2019. The contents of that application in its entirety are hereby incorporated by reference.

TECHNICAL FIELD

The present disclosure relates generally to locator systems, and more particularly, to a system with portable beacon units that may be activated via a network transmission to provide guidance along a path.

BACKGROUND

There are numerous people that participate in outdoor activities. For example, in 2017 101.6 million people participated in hunting and fishing. The number of hikers in the US as reported in 2017 was 44.9 million. The number of people who participated in camping in 2017 in the US was 41.77 million. Outdoorsmen need assistance in navigation in different types of terrain. For example, paths are often marked by the use of reflective blazes affixed to vertical surfaces and illuminated by traditional flashlights. This solution has the combined issues of relying on highly directional mechanisms of reflection and direct illumination of the hiker/hunter. Thus, the reflective blazes may often be missed by a hiker because they are shinning the light from an angle that does not cause reflection from the blazes.

One solution has been to use remotely activated beacons that will activate to guide a hiker. However, known remotely activated beacons still rely on direct illumination by infrared signals (again highlighting the location of the hiker/hunter), and have not resulted in easily operated implementations. Further, only one beacon may be activated at a time, and thus if one beacon in the sequence is not acquired, the hiker cannot follow the path.

Thus, there is a need for a beacon system that allows individually addressed activation signaling of several beacons for waypoint determination on a path. There is a further need for the ability to deploy multiple beacons in the same operational area for multiple, distinct trail-marking networks with the same point of origin. There is a further need for a receiver beacon that allows maximum visibility of a beacon indicator.

SUMMARY

One disclosed example is a remotely activated receiver beacon. The receiver beacon includes a transceiver receiving and sending signals to other devices. The receiver beacon includes an indicator that when activated indicates the location of the receiver beacon. A controller is coupled to the indicator and the transceiver. The controller receives a command signal to activate the indicator. The controller also causes the transceiver to relay the command signal to another receiver beacon.

Another disclosed example is a path finding system that includes a plurality of receiver beacons. Each of the receiver beacons include a transceiver receiving and sending signals and an indicator that when activated indicates the location of the receiver beacon. Each of the receiver beacons include a controller coupled to the indicator and the transceiver. The controller is operable to receive an activation signal to activate the indicator. A transmitter is paired with each of the plurality of receiver beacons. The transmitter includes a transceiver to send an activation signal to at least one of the receiver beacons. When the receiver beacon receives the activation signal it activates the indicator, and relays the activation signal to at least another receiver beacon.

Another disclosed example is a method of path finding that includes pairing a transmitter with a plurality of receiver beacons distributed along a path. Each of the receiver beacons include a transceiver receiving and sending signals; an indicator that when activated indicates the location of the receiver beacon; and a controller coupled to the indicator and the transceiver. An activation signal is transmitted from the transmitter to one of the plurality of receiver beacons. The activation signal is received by one of plurality of receiver beacons. The indicator is activated. The receiver beacon relays the activation signal to at least another one of the receiver beacons.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of embodiments together with reference to the accompanying drawings.

FIG. 1A shows a perspective view of an example waypoint receiver beacon;

FIG. 1B is a cutaway view of the example waypoint receiver beacon in FIG. 1A;

FIG. 2A shows a front view of an example compact transmitter used with the example waypoint receiver beacon in FIG. 1A;

FIG. 2B shows a side perspective view of the example compact transmitter in FIG. 2A FIG. 2C shows the components of the example compact transmitter in FIG. 2A;

FIG. 6A is a front view of an example portable motion detector;

FIG. 6B is a back view of the example portable motion detector in FIG. 6A;

FIG. 11 shows a flow diagram for the setup and activation routine for a pathfinding system using the example receiver beacon and transmitter.

Figure 3:
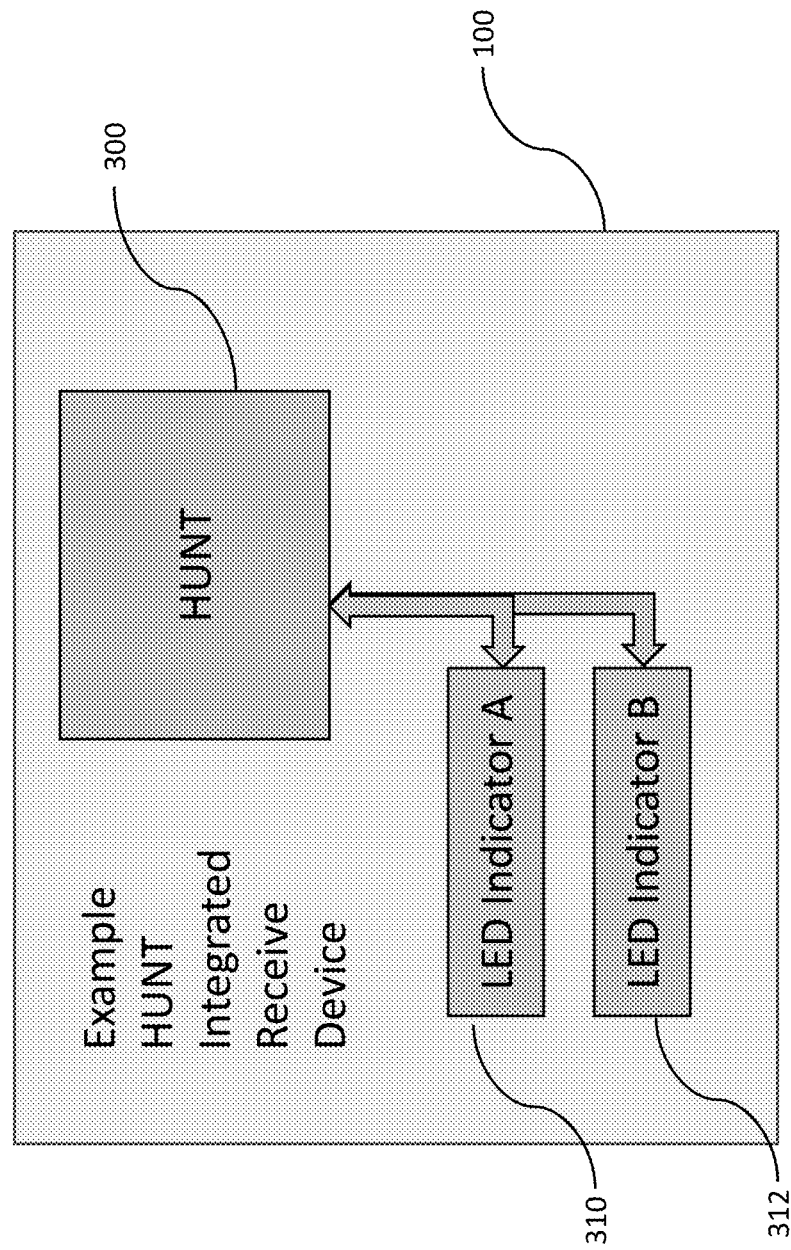
FIG. 3 is a block diagram of the operation of the example waypoint receiver beacon in FIG. 1A.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

One example of the present disclosure is a remote-controlled navigation beacon system that utilizes a series of receiver beacons with LEDs that are placed at waypoints in a path, and a handheld transmitter. The LEDs on the receiver beacons are activated by the transmitter to guide people to and from a predetermined final location on the path. The network system for the beacons and the transmitter is a radio frequency networked system consisting of one or more activation transmitters and one or more transmission beacon relay/receivers. The beacon devices incorporate the LED illumination mechanisms for path marking. The system allows for a single or numerous beacon unit(s) (remote-controlled LED strobe lights) to be affixed to objects (man-made or natural) in a sequence that when illuminated (using the transmitter) provide a navigation path or locate a single item for the user.

FIG. 1A shows a perspective view of an example waypoint system receiver beacon 100. FIG. 1B is a cutaway view of the example waypoint system receiver beacon 100. In this example, the waypoint system receiver beacon 100 includes a pre-formed housing 110 having an enclosed side and an opposite open side. A front transparent faceplate 112 (removed in FIG. 1B) is attached to the open side of the housing 110 to enclose a printed circuit board 114. The interior of the housing 110 may include other components such as the power source, antenna, and cables.

The housing 110 includes two opposite side walls 120 and 122. A triangular top end 124 is formed with a hole 126. The hole 126 may be used to attach the receiver 100 to a hook shaped structure. The hook structure may be used to suspend the housing 110 via the top end 124 on objects such as trees at eye level or above for greater visibility of the receiver beacon 100. A rear panel 130 joins the front wall 120, rear wall 122, and top end 124 to define the interior volume of the housing 110. A cylindrical housing 132 is attached to the bottom of the housing 110 opposite the top end 124. In this example, the cylindrical housing 132 holds a battery that may be inserted by unscrewing a removable circular cap 134.

In this example, the receiver beacon 100 may incorporate a location indicator such as light emitting diodes (LEDs) mounted on the printed circuit board 114 and visible through the faceplate 112. The example location indicators, when activated, indicate the location of the receiver beacon 100. In this example, the printed circuit board 114 includes two LEDs 136 and 138 that are mounted on opposite sides of the surface of the printed circuit board 114 visible from the faceplate 112. Any number of LEDs may be mounted at any location of the surface of the printed circuit board 114 visible through the faceplate 112.

The LEDs 136 and 138 may be varied in the emission band and may range from wide band visible light (i.e. cool white spectra) to 850 nm infrared and 940 nm infrared (i.e. night vision IR in both commercial and military spectra). Alternatively, the rear panel 130 may include a transparent window. In this alternative, the other side of the circuit board 114 will have one or more LEDs. Since light will be emitted from both sides of the housing 110 from LEDs, visibility of the light is available from 300 degrees of the horizon. Thus, the visibility is only limited by the illumination angles of the LED element housings on either side of the circuit board 114.

In this example, the receiver beacon 100 is powered by a battery such as a nine-volt alkaline battery or a non-rechargeable CR123A lithium battery, offering more than 31 days of passive listening operation and an additional two non-continuous days of activated operation. The receiver beacon 100 may optionally have a rechargeable battery that may be recharged via a USB type charger port installed for example at the opposite end of the cap 134.

As will be explained one or more receiver beacons 100 is paired with a compact transmitter carried by a user to set up a waypoint system using a universal networked transceiver architecture. In this example, a number of receiver beacons such as the receiver beacon 100 are paired with the specific transmitter such as the transmitter 200 at the time of manufacture. Of course, other means may be employed to pair the beacon receivers to a specific transmitter. FIG. 2A shows a front view of an example compact transmitter 200 used with the example waypoint receiver beacon 100 in FIG. 1A. FIG. 2B shows a side perspective view of the example compact transmitter 200. FIG. 2C shows an exploded view of the components of the example compact transmitter 200.

The transmitter 200 includes an enclosure 210 that is composed of a front shell 212 and a back shell 214. In this example, the casing 210 may be an off-the-shelf two-button key fob enclosure. However, any shape may be used and any number of buttons for different functions may be used.

A printed circuit board 216 is supported by the bottom shell 214. The front shell 212 includes an exterior surface 220 that includes buttons 222 and 224. The buttons 222 and 224 are mounted in an interior rectangular frame 226 on the interior surface of the front shell 212 opposite the exterior surface 220. The buttons 222 and 224 are in mechanical engagement with contact pads 228 and 230 that are supported by the frame 226. The printed circuit board 216 includes two electronic tactile switches 232 and 234 that are activated by pressing the buttons 222 and 224 to engage the respective contact pads 228 and 230. In this example, the tactile switches 232 and 234 are APEM MJTP1138ATR tactile switches, but any appropriate tactile switch may be used. In this example, when the button 222 is pressed, a first blink pattern will be activated from the paired receiver beacons, and when the button 224 is pressed a second blink pattern will be activated from the paired received beacons. In this example, the first pattern may be a series of six blinks of half second duration with a half second between the blinks. The second pattern may be a series of 12 blinks of a 0.2 second duration with an interval of 0.35 seconds between blinks. Of course, other patterns with different numbers of blinks, duration lengths and interval lengths may be used.

In this example, the printed circuit board 216 includes a combined controller and transceiver integrated circuit chip mounted on the opposite side of from the tactile switches 232 and 234. The transmitter device 200 in this example further incorporates a Bluetooth compliant chipset such as an HM-11 module and an antenna on the printed circuit board 216. The Bluetooth chipset is connected to the transmitter controller integrated circuit chip by a serial digital interface. In this example, the controller and transceiver are a Texas Instruments CC1110 integrated circuit. The transmitter device 200 in this example is powered by a 2032 coin cell battery, offering more than 1000 discrete transmissions. The transmitter device 200 may also be optionally recharged via a recharging system such as a USB charger.

The interior edges of the front and bottom shells 212 and 214 include registration features for mating the two shells 212 and 214 together. The shells 212 and 214 may be joined by screws or other attachment mechanisms. The top end of the shells 212 and 214 form an aperture 240 that may be used to attach the transmitter 200 to a clip or other device.

FIG. 3 is a block diagram of the LEDs 136 and 138 operated by the receiver 100 in FIG. 1A. FIG. 3 shows a combined transceiver and controller module 300 that activates either lighting circuit 310 and 312. As will be explained, the controller of the controller module 300 may receive an activation signal on the transceiver from the transmitter device 200. The controller on the controller module may then activate lighting circuits 310 and 312. The controller may also cause the activation signal to be transmitted to other receivers in range of the receiver 100. The lighting circuits 310 and 312 cause power to be supplied to light the respective LED 136 or 138.

Each of the receiver beacon unit(s) such as the receiver beacon 100 contain the two LEDs 136 and 138 in this example. In this example, the LEDs 136 and 138 are battery powered and are controlled by a 900 MegaHertz frequency activation signal sent by the user from a transceiver on the transmitter device 200. The user controls how often the LEDs 136 and 138 are illuminated. A single receiver beacon unit may be used for locating a particular item (for example a jug fishing system). Alternatively, a series of receiver beacon units can be deployed for navigation to a particular location. In order to better manage battery life, the LEDs 136 and 138 of the receiver beacon 100 are programmed to only strobe a maximum set number of times such as five times before terminating power to the LEDs 136 and 138 for that cycle. The LEDs 136 and 138 may be programmed for providing continuous light, other strobing patterns, and other durations.

Figure 4:
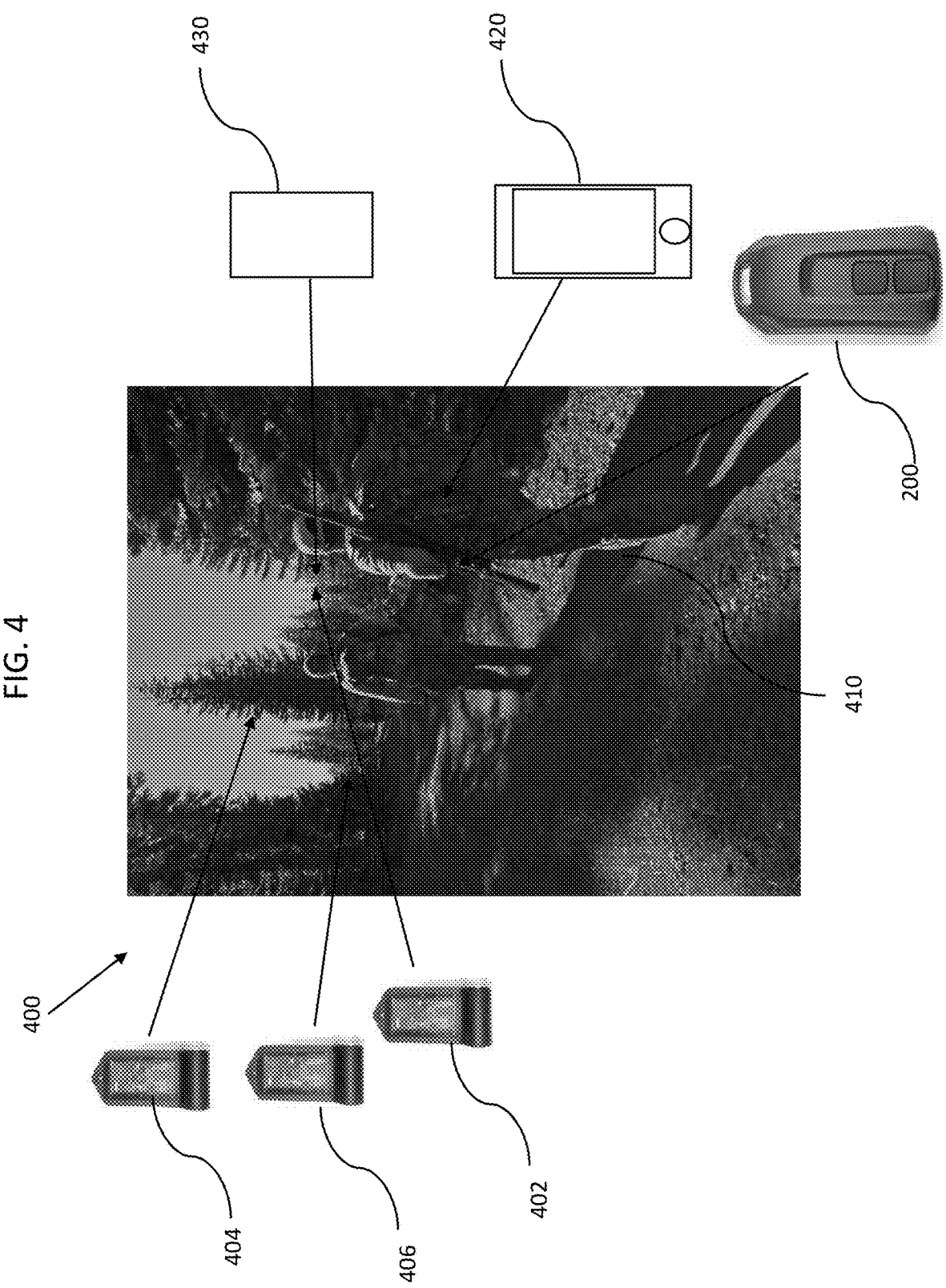
FIG. 4 shows an example waypoint system where the receiver beacons are laid out for use with the compact transmitter in FIG. 2A.

The design of the receiver beacon units such as the receiver beacon 100 incorporates a transceiver, which permits the receiver units 100 to relay a signal from the transmitter to other nearby receiver units 100. The design of the receiver beacon units 100 includes serialization, which permits each receiver beacon unit 100 to be activated by itself, or in groups. In this example, the transmitter 200 has certain factory configured messages that are tagged for commanding the receiving beacon to relay the message to all other receiver beacons in range. Other messages may be configured by other types of transmitters such as a mobile computing device. The design of the receiver beacon 100 may include a variety of activation message formats, permitting a variety of activation response patterns, as well as encrypted communication. In this example, the message format includes eight payload bytes. The unencrypted contents include a two-byte serial matching descriptor which permits pairing, a one-byte format identifier which indicates the desired blink pattern, and a time to live (TTL) byte which indicates the remaining number of retransmissions. In this example, the TTL byte is decremented for each retransmission. Transmission of a message with a zero value in the TTL byte results in no retransmission by the recipient receiver beacon FIG. 4 shows an example waypoint system 400 that has a deployment of a number of receiver beacons such as the receiver beacons 402, 404 and 406 in a forest setting. Each of the receiver beacons 402, 404, and 406 are identical to the receiver beacon 100 described above. The receiver beacons 402, 404, and 406 are hung from various points along a desired path for greater visibility. In this example, some or all of the receiver beacons 402, 404 and 406 may be suspended on trees along the desired path for greater visibility. The receiver beacons 402, 404, and 406 serve as navigation beacons as will be explained below. A hiker 410 carries the transmitter 200 and can activate the LED lights on each of the receiver beacons to assist in guidance along the path. An optional mobile device such as a smartphone 420 may be carried by the hiker 410. The smartphone 420 may execute an application that communicates with the receiver beacons 402, 404, and 406 as well as the transmitter 200. The application allows a greater variety of commands to be sent to the receiver beacons 402, 404, and 406. An optional external device 430 in the vicinity of the path may be activated by a command or activation signal from the transmitter 200. For example, the external device 430 may be a permanent light that is turned on from the signal from the transmitter 200. Alternatively, the external device 430 may be a gate or door controller that when activated by the transmitter opens the gate or door. Other appliances or equipment may serve as the external device 430 and be activated by the signal from the transmitter.

The remotely controlled LED lights of the receiver beacons 402, 404, and 406 in this example are positioned during trail blazing or other path marking activity. After the receiver beacons are placed, the system 400 allows the hiker 410 to use a paired transmission device such as the transmitter 200 to illuminate one or more of the receiver beacons 402, 404, and 406 to indicate the next landmark along the trail. The example waypoint system 400 significantly increases the capabilities of prior systems, through the use of messaging technology, and incorporation of relay capability in the receiver beacons 402, 404, and 406.

The example waypoint system 400 in FIG. 4 incorporates four subsystem elements: the transmitter device 200, the receiver beacons 402, 404, and 406, the optional mobile computing device such as the smart phone device 420, and the optional power switched external device 430. The transmitter device 200 is the origination point for the activation signal at each point along the marked trail. The receiver beacons 402, 404, and 406 each may act as a range boosting relay for the transmitted activation signal along lengthy trails. The system may also incorporate the illumination or external power switching response circuit. The external device 430 may provide responsive actions beyond illumination, such as access gate passage or other functions from electrically operated appliances or equipment, depending on the type of external device 430. The smart phone device 420 provides a robust control interface for more complex trail controls than that offered by the buttons of the transmitter 200. In this example, there are 256 possible message format identifiers. Two of the identifiers are assigned to the buttons 222 and 224 on the transmitter device 200. A control interface generated by an application on the smart phone device 420 allows the transmitter 200 to be directed to transmit message format identifiers other than the two assigned to the buttons by factory configuration for performing other functions such as other blinking patterns, continuous illumination, remote device operational data status query (e.g., battery status, component functioning, etc.), or remote shutdown control.

In an operational system, one or more transmitter devices such as the transmitter 200 are paired with one or more receiver beacons in order to provide a radio-frequency network for the transmission and relay of activation signals. Messages originate from the transmitter 200 to all receiver beacons in the range of the signal. Each receiver beacon interprets the message, determining if the signal will result in activation of a response, the nature of such a response, and whether that receiver beacon will issue a retransmission of the message to other receiver beacons in its signal range. If present, the optional smart phone control device 420 can trigger the transmission of a message by the transmitter device 200, using the standardized wireless Bluetooth protocol. If present, the optional external device 430 may be connected in line with an individual receiver beacon. The attached receiver beacon may have activation responses that include passing power signals or control signals to the external device 430, allowing remote control of the external device 430 along the trail. For example, when the receiver beacon is activated in response to a message from the transmitter 200, the receiver beacon may permit voltage supply or signaling to the external device 430. This results in activation of external device functions such as powering of electric motors, illumination of AC powered security lighting, or triggering of a security gate.

In one example, the transmitter 200 and the receiver beacons 100 are configured for operation in a number of channels within the 900 MHz ISM band of the US spectrum allocation. The example transmission characteristics are a multi-byte message, qualified by a 32-bit cyclic redundancy checksum, Manchester-encoded at 9.6 kilobits per second, using 2-valued Frequency Shift Keying (2-FSK) operating with a channel spacing of 200 kiloHertz. The transmitter device 200 and the receiver beacon 100 of this example share an RF chip-set and antenna architecture implemented as a single printed circuit assembly with a 900 MHz chip antenna and integrated circuit matching balun.

The example transmission system may be implemented in the 2.4 GHz or 5 GHz ISM bands by exchanging the 900 MHz chipset and corresponding antenna. Applications requiring additional security, privacy, or covertness may be implemented using a frequency-hopping spread-spectrum transmission protocol. A variety of control techniques may be applied to the switched external device 430 including serial messaging over an RS-232 interface, two- or three-phased alternating current (AC) switching, or pulse width modulated control outputs.

The system of remotely controlled navigation receiver beacons allows the preparation of an active trail marking to guide people transiting between a predetermined series of locations, and to operated access control equipment along the path. The system allows for a single or numerous unit(s) (e.g. remote controlled LED strobe lights) to be affixed to objects (man made or natural) in a sequence that when activated (using the transmitter 200) provide a navigation path or single item localization (e.g. jug fishing placement) for the user.

The design of the example receiver beacon 100 includes frequency agility within the 900 MHz ISM band or any implemented frequency band, permitting co-located independent operation of two or more networked systems of this design without interference. A variant of the receiver beacon design replaces visible spectrum illumination with infrared illumination in the 850 nm or 940 nm spectrum for support of night vision equipment. A variant of the beacon design replaces visible spectrum illumination with in-line, isolated power switching for an external device, such as a street light or access gate. Another alternative may be non-LED lighting. Another alternative may be an audio tone or sound in addition or separately from the LEDs in the receiver beacons.

The system concept is intended to limit the detectable emissions from the hiker/hunter. The receiver beacon design incorporates message relay for improved range. The receiver beacon design incorporates individual receiver beacon serialization to permit beacon specific messaging. The receiver beacon design incorporates frequency agility to permit multiple system installations at a single location. The system allows multiple frequency shift keyed (FSK) channel assignments within the transmission band. Different message format identifiers in the eight byte payload of the messages allow different receiver behaviors. Different serial pairing codes allow transmitters with unique pairing codes to only activate corresponding receiver beacons despite the presence of in-range unmatched receiver beacons or transmitters. The receiver beacons receiving messages, which coincide with the factory configured matching value in these two bytes, will take the corresponding responsive action to the message received, while other receiver beacons will ignore those messages. The pairing value acts as a bitwise mask, permitting up to 16 potential overlapping functional groups of receiver beacons.

The receiver beacon design may incorporate support for encrypted communication. Encrypted communications permit secure, non-identifying transmission of activation signals, permitting privacy protection and exclusive activation rights to the operator of the transmitter and receiver beacons.

A variant of the example receiver beacon design incorporates switch control for an external device. A variant allows transmitter control from a typical smart phone device. A variant allows activation of a receiver by a transmitter having a Passive Infra-Red (PIR) signal sensor reacting to the passage of a body or object naturally emitting or reflecting ambient infra-red light.

Alternatives methods include use of encrypted messaging, keyed to a specific set of transmitters and beacons. The design of the transmitter and receiver beacon pairs allows use of a variety of frequency spectra, with the transmit frequency and antenna incorporated as modular elements of the design, easily swapped. One transmitter design variant incorporates a Bluetooth hardware module, permitting wireless control of the activation signaling from a smart phone device. One beacon variant incorporates switch control of an external device.

The disclosed features may be applied in a variety of example scenarios. Such uses include: 1. Visual navigation for hunters for ingress/egress in and out of geographic points and game tracking; 2. Fishing—allowing for location finding for bank poles and floating jugs; 3. Land Navigation/Trail Markers for hiking, races, group events and similar activities; 4. Small boat navigation including channel markers, landing points, and obstacles; 5. Game trap lights; 6. Remote triggering of trap doors, light switches, gates and other devices; 7. Clearing a building for first responders to mark cleared rooms including SWAT teams and fire departments; 8. Identifying specific routes through color coded light systems; 9. Spelunking navigation and group safety; 10. Requirements for position locators invisible to the naked eye; 11. Urban search and rescue marking for search locations; and 12. Passive infrared detection of predatory animal threats to outdoorsmen when threats are approaching around blind corners.

By limiting the hiker/hunter emissions, the impact to local fauna due to the nighttime presence of the hiker/hunter is minimized. Moreover, users with an interest in concealing their transit benefit. The improved range due to the relay capability permits a robust activation in damp forest conditions, where signal absorption, multi-path collision, or terrain issues might compromise the direct transmission.

As explained above, the waypoint system 400 allows individually addressed activation signaling or message controlled variation of the activation response for the receiver beacons. This feature allows multi-modal beacons and situationally appropriate use of the system for multiple scenarios. The example system allows 256 different transmission formats, each of which can be factory configured to result in a distinct beacon illumination pattern, relay function, or other operation. An example is two separate messages distinguishing operation of a visible spectrum LED in one case, and a night-vision infrared spectrum LED in another. As explained above, there may be concurrent, non-interfering installation of multiple systems in the same operational area, which permit deployment of multiple, distinct trail-marking networks with the same point of origin.

Figure 5:
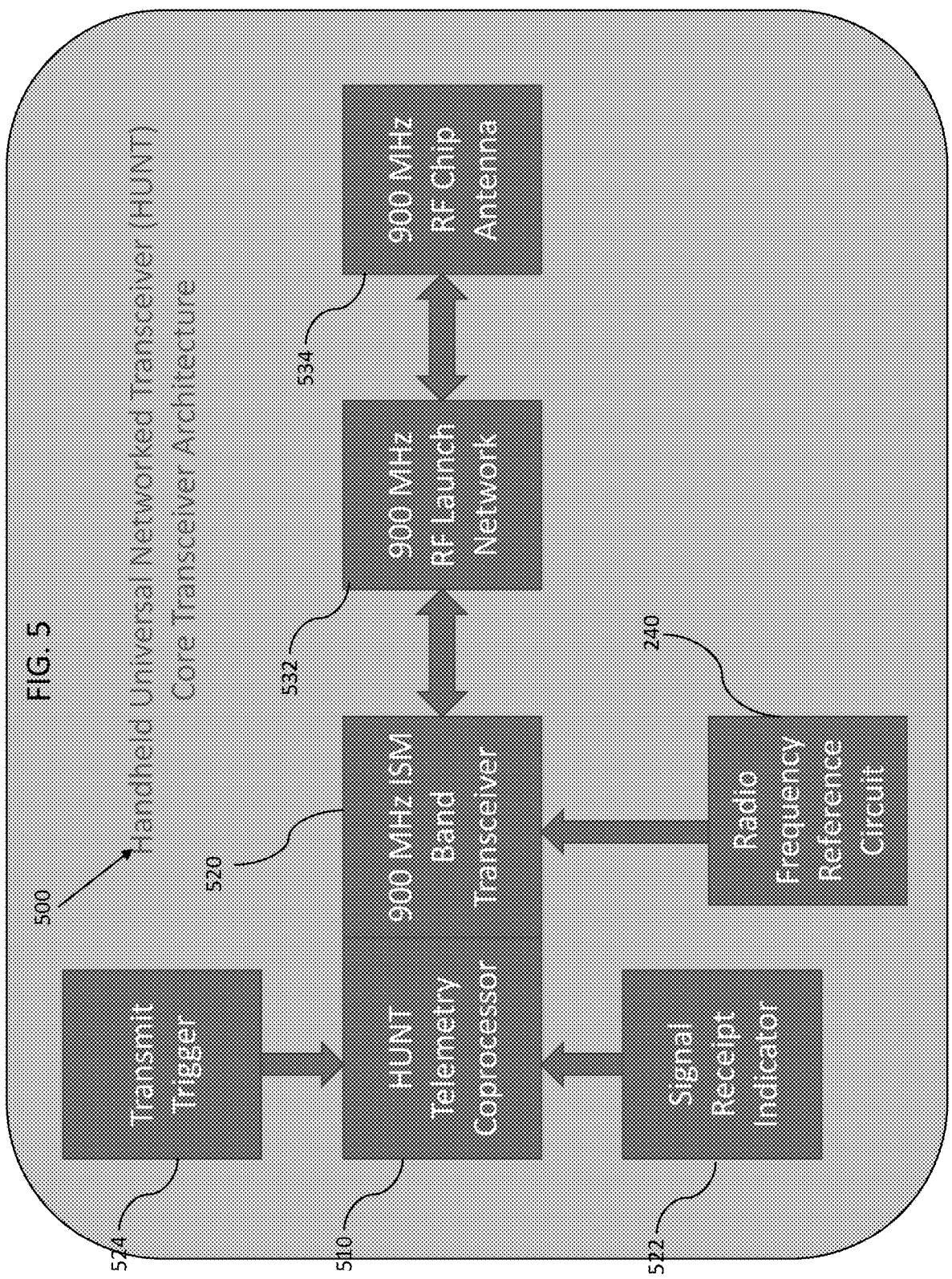
FIG. 5 is a block diagram of an example networked transceiver architecture for the example motion detector and waypoint systems.

FIG. 5 is a block diagram of an example networked transceiver architecture 500 for the transmitter 200 in the example waypoint system 400. The architecture 500 includes a telemetry co-processor 510 and a transceiver 520. In this example, the transceiver 520 is operating at the 900 MHz ISM band. The coprocessor 510 receives inputs from a signal receipt indicator circuit 522 and a transmit trigger 524. A radio frequency reference circuit 530 is coupled to the transceiver 520. The reference circuit 530 in this example is a Temperature Compensated Crystal Oscillator (TCXO). As the temperature of the circuit changes in response to environmental factors, the oscillator circuit subtly modifies the loading characteristics of the crystal oscillator to ensure that the physical frequency oscillations of the crystal do not vary from the calibrated reference specification. In the reference design, the specified frequency is 26 MHz. The transceiver 520 communicates with an RF launch network 532. An antenna 534 is coupled to the RF launch network 532.

Figure 6D:
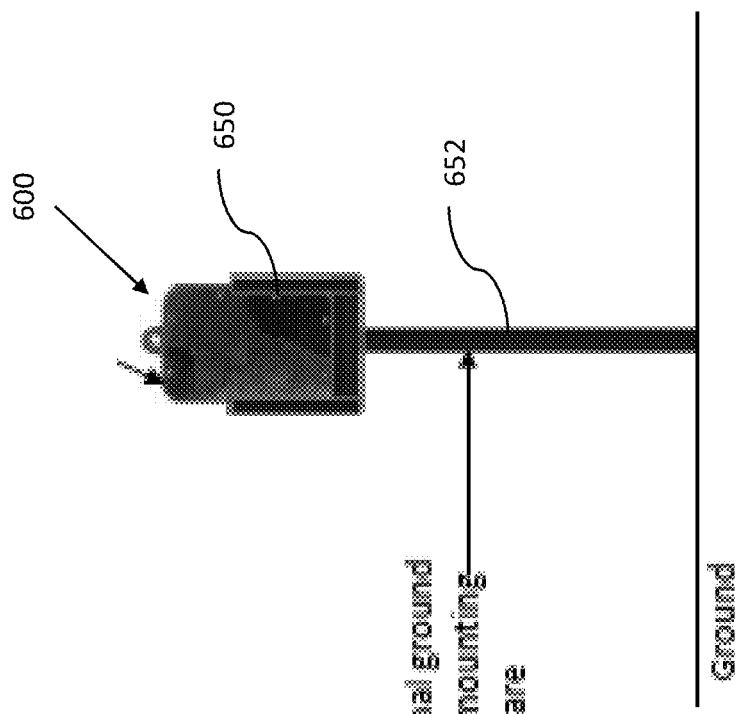
FIG. 6D is a view of the example portable motion detector in FIG. 6A mounted on a stake.
Figure 6C:
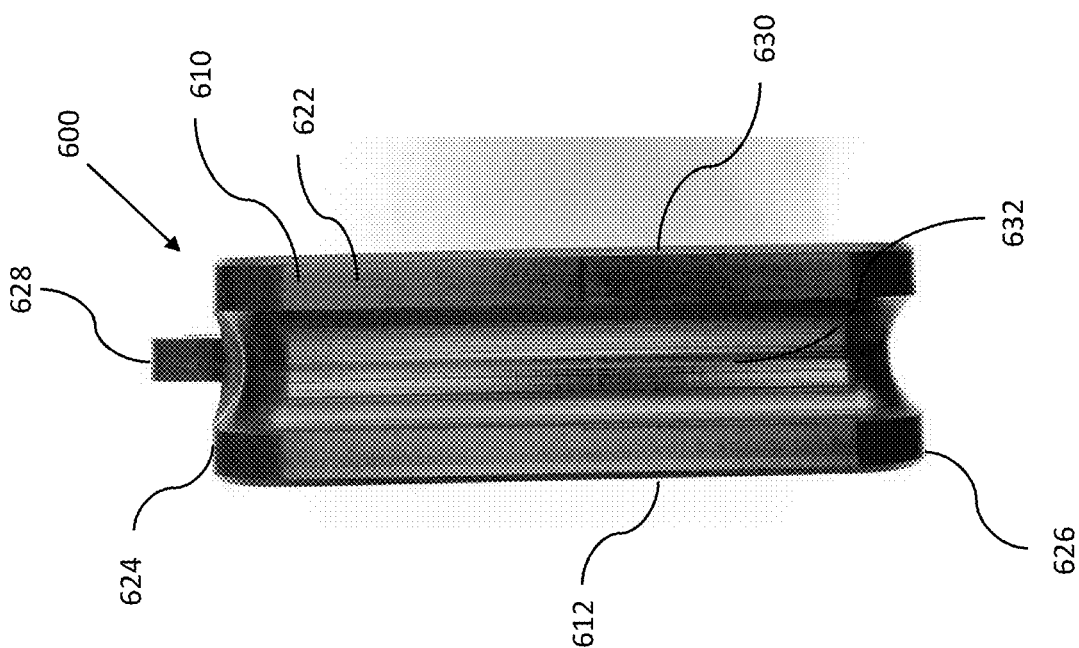
FIG. 6C is a side view of the example portable motion detector in FIG. 6A.

The networked transceiver architecture 500 may be deployed for purposes other than navigation. For example, another application of the disclosed principles is a network to remotely receive triggering signals from a motion detector. FIG. 6A is a front view of an example portable motion detector 600. FIG. 6B is a view of the interior components of example portable motion detector 600. FIG. 6C is a side view of the example portable motion detector 600. FIG. 6D is a view of the example portable motion detector 600 mounted on a stake.

The motion detector 600 includes a pre-fabricated housing 610 having an enclosed side and an opposite open side. A front transparent faceplate 612 (removed in FIG. 6B) is attached to the open side of the housing 610 to enclose a printed circuit board 614, a battery 616, and a motion sensor circuit 618. The motion sensor circuit 618 in this example is a Passive Infrared (PIR) detector, operating in the near IR spectrum. Change detection for motion sensing is made possible by use of interference banding imposed by a Fresnel-style lens placed over a sensing aperture. In this example, the motion sensor circuit 618 includes a self-tuning digital-trigger PIR module that is activated by detection of the motion. The interior of the housing 610 may include other components such as an antenna and cables.

The housing 610 includes two opposite sides 620 and 622. A top wall 624 and a bottom wall 626 join the opposite sides 620 and 622. The top wall 624 includes a protruding tab 628 with a hole. The hole in the protruding tab 628 may be used to attach the motion detector receiver 600 to a hook. The hook may be used to suspend the housing 610 via the tab 628 on objects such as trees at eye level or above. A rear panel 630 joins the side walls 620 and 622, front wall 624, and rear wall 626 to define the interior volume of the housing 610. As shown in FIG. 6C, the sides 620 and 624 may include an exterior groove 632 that allows different types of mounting hardware to engage the housing 610.

In this example, the motion detector 600 operates via the motion sensor circuit 618 which reacts to the passage of a body or object naturally emitting or reflecting ambient infra-red light. Motion in front of the face plate 612 effects a detectable variation in the received IR levels, triggering the digital-trigger PIR module of the motion sensor circuit 618. A transmitter mounted on circuit board 614 may send a signal to a remote device indicating that motion has been detected. The motion detector 600 may be suspended via a hook through the hole in the tab 628 on objects such as trees or poles. Alternatively, as shown in FIG. 6D, the motion detector 600 may be mounted in a frame 650 that is configured to snap into the grooves 632 of the sides 620 and 622 to hold the housing 610. The frame 650 is attached to a ground stake 652 that may be inserted in the ground at the desired location of the motion detector 600.

In this example, the motion detector 600 is powered by either a standard 1.5 volt alkaline battery or a non-rechargeable lithium battery, offering more than 31 days of passive listening operation and an additional two non-continuous days of activated operation. The motion detector 600 may optionally be rechargeable such as via USB type charger port.

Figure 7A:
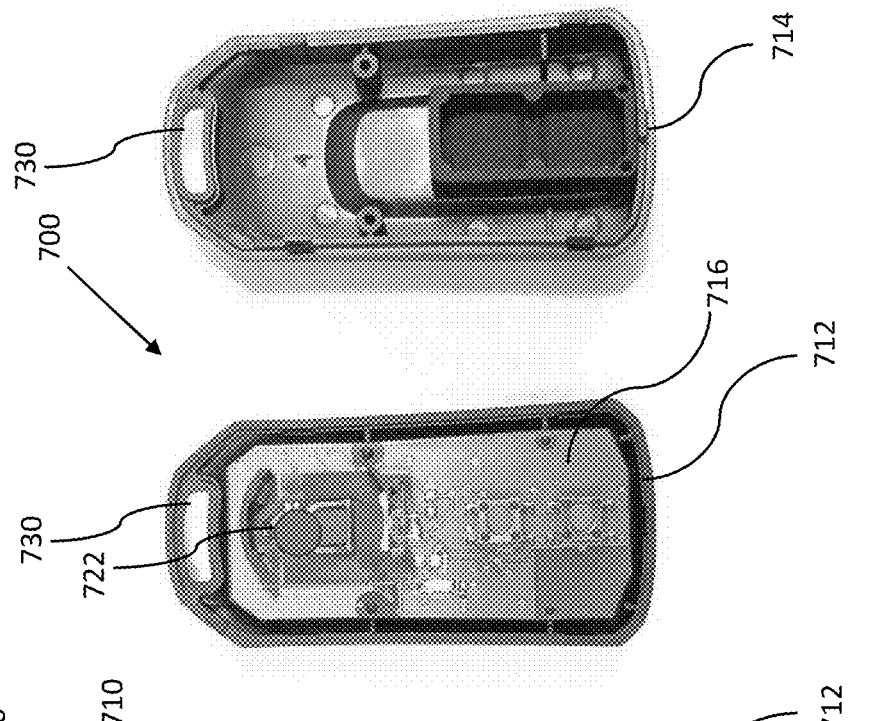
FIG. 7A shows a front view of an example compact receiver used in conjunction with the example motion detector in FIG. 6A.
Figure 7B:
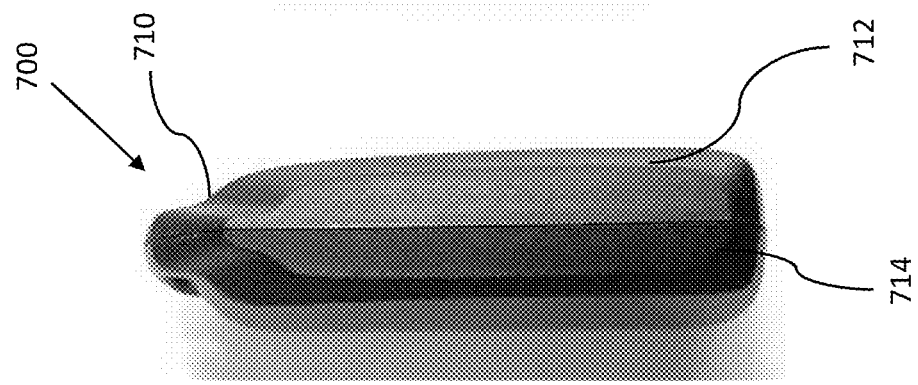
FIG. 7B is a side view of the example compact receiver in FIG. 7A.
Figure 7C:
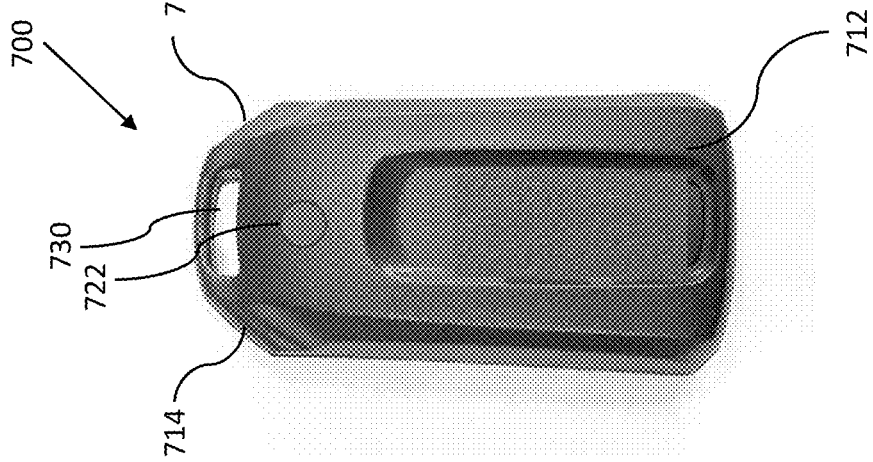
FIG. 7C shows an exploded view of the components of the example compact receiver in FIG. 7A.

As will be explained one or more motion detectors 600 is paired with a compact receiver carried by a traveler to set up detection system using the universal protocol networked transceiver architecture in FIG. 5. In this example, the pairing is performed in the manufacturing process. FIG. 7A shows a front view of an example compact receiver 700 used with the example motion detector 600 in FIG. 6A. FIG. 7B shows a side perspective view of the example compact receiver 700. FIG. 7C shows an exploded view of the components of the example compact receiver 700.

The receiver 700 includes an enclosure 710 that is composed of a front shell 712 and a back shell 714. A printed circuit board 716 is mounted on the back shell 714. The front shell 712 includes an exterior surface 720 that includes an LED 722 mounted on the printed circuit board 716 and projecting through an aperture on the front shell 712. In this example, the controller of the receiver 700 will receive a signal from the motion detector 600 indicating detected motion and will light the LED 722. The controller of the receiver 700 may keep the LED 722 on for a predetermined period of time. The controller of the receiver 700 may also strobe the LED 722 for a predetermined period of time or as long as motion is detected by the motion sensor 618 on the motion detector 600. This provides a silent indicator to the user that motion has been detected. Alternatively, other indicators may be used such as audio indicators or graphics displayed on a display screen.

In this example, the printed circuit board 716 includes a controller/transceiver integrated circuit chip, which may be a Texas Instruments CC1110. The receiver 700 in this example is powered by a 2032 coin cell battery mounted in the back shell 714 under the circuit board 716. In this example, the battery offers more than 1000 discrete received signals and corresponding activations of the LED 722. The transmitter device 700 may also be optionally recharged via a recharging system such as a USB charger.

The interior edges of the front and bottom shells 712 and 714 include registration features for mating the two shells 712 and 714 together. The shells 712 and 714 may be joined by screws or other attachment mechanisms. The top end of the shells 712 and 714 form an aperture 730 that may be used to attach the receiver 700 to a clip or other device.

Figure 8:
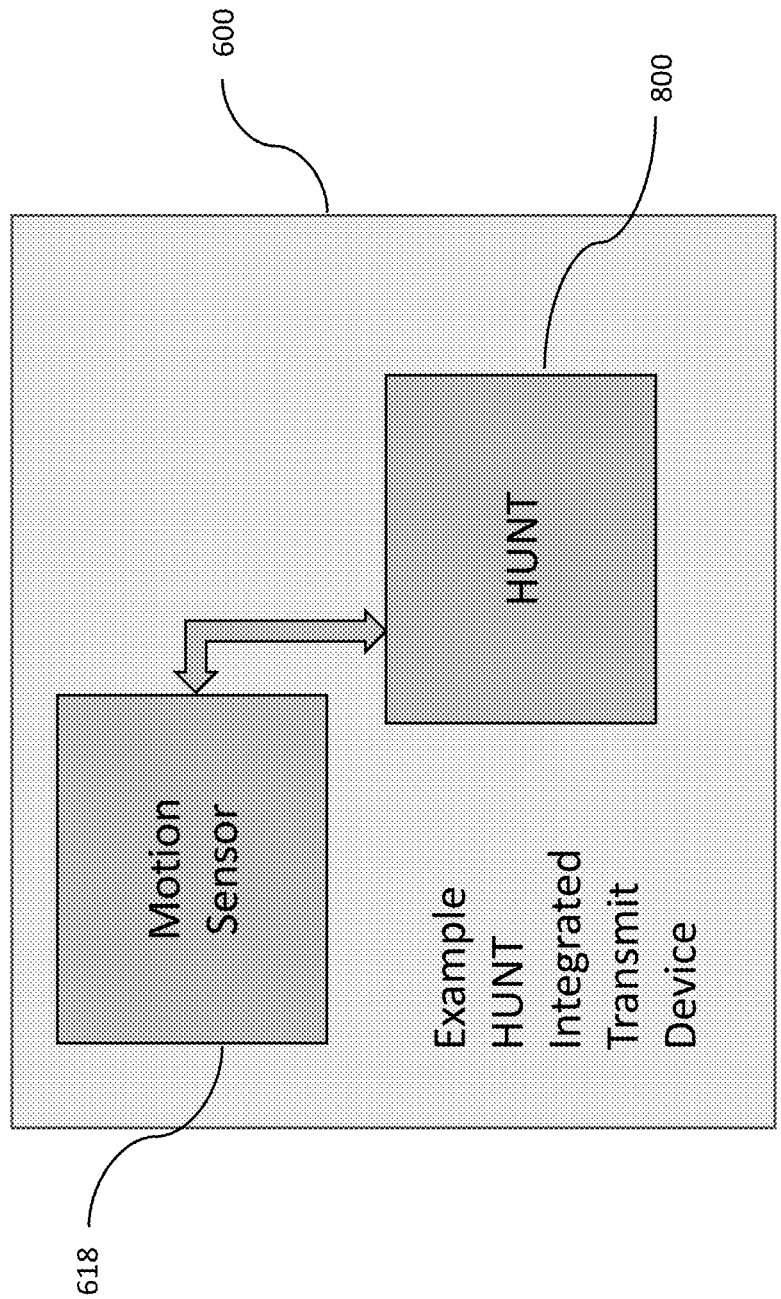
FIG. 8 is a block diagram of the motion detector.

FIG. 8 is a block diagram of the motion sensor 618 in operation with a combined transceiver and controller module 800. As will be explained, the controller of the controller module 800 may receive a signal from the motion detector sensor 618. The controller on the controller module 800 may then transmit a signal to the receiver 700.

Figure 9:
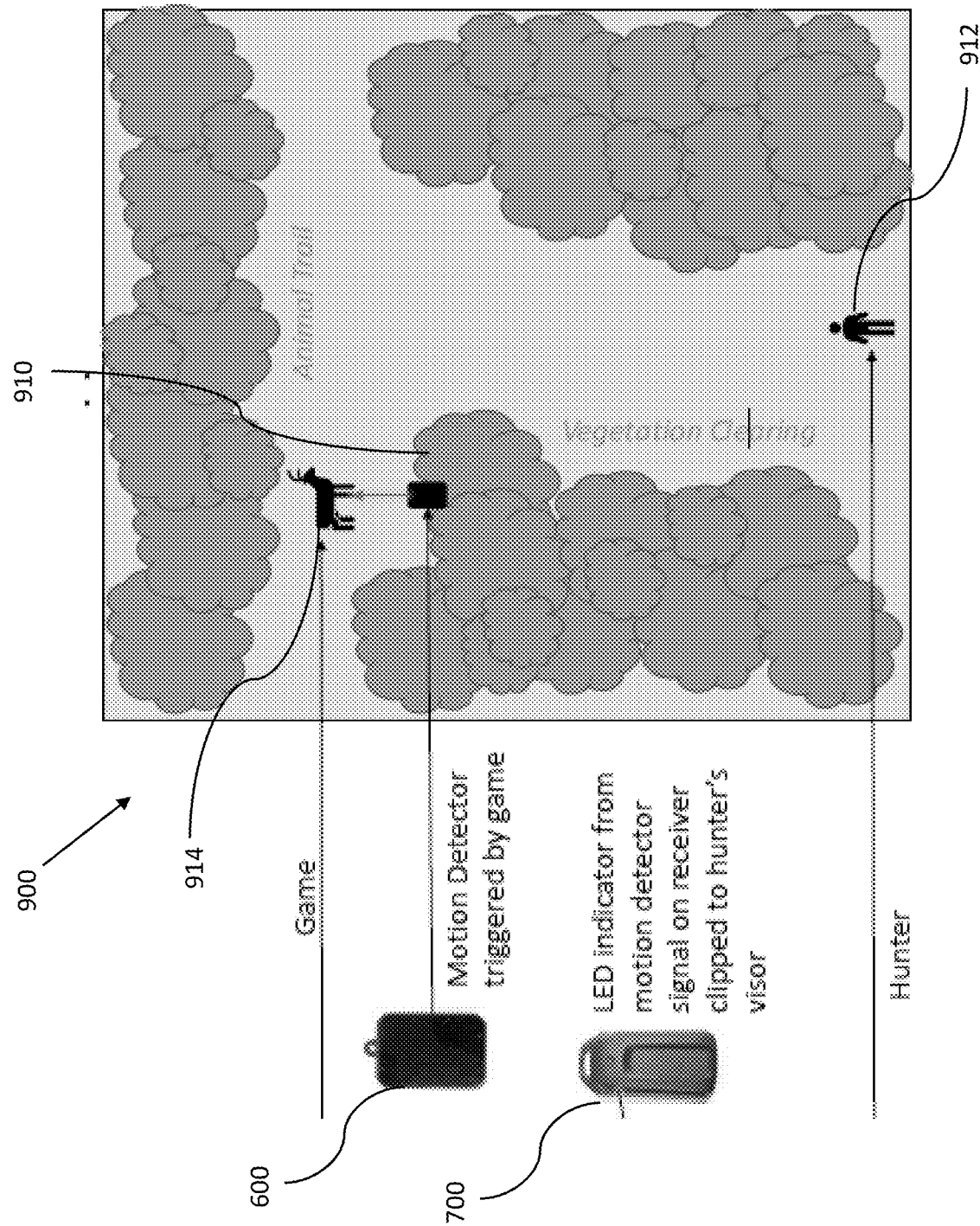
FIG. 9 shows an example deployment of an example portable motion detector receiver system using the receiver and motion detector.

FIG. 9 shows an example deployment environment 900 of an example portable motion detector receiver system using the receiver 700 and the motion detector 600. In this example, the environment 900 is a forest having obscuring fauna 910. The receiver 700 is carried by a hunter 912 that is using the placement of the motion detector 600 to detect the presence of game 914. The hunter 912 carries the receiver 700 in a position to allow visual observation. For example, the receiver 700 may be clipped to a visor worn by the hunter 912. In this example, the motion sensor 618 of the motion detector 600 is triggered by the movement of the game 914. A signal is sent by the motion detector 600 to the receiver 700. The receiver 700 will cause the LED 722 to blink. This provides an alert to the hunter 912 that the game 914 is approaching.

Figure 10:
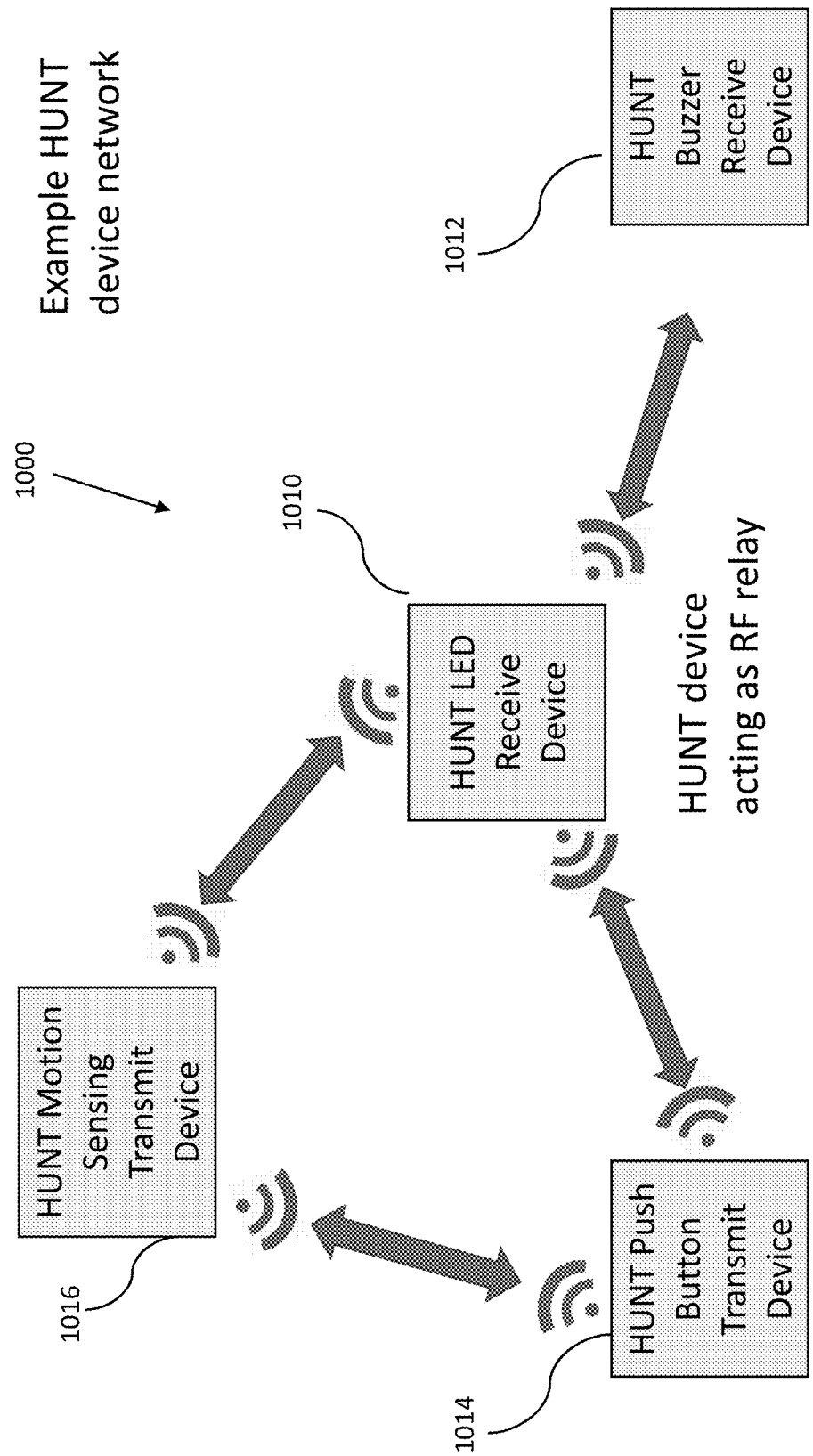
FIG. 10 is a block diagram of an example network setup from the architecture in FIG. 5.

A network may be created using devices that are capable of transmitting and receiving signals based on the universal communication protocol system shown in FIG. 5. Such devices may include the receiver beacon 100 in FIG. 1A, the transmitter 200 in FIG. 2A, the motion detector 600 in FIG. 6A, or the transmitter 700 in FIG. 7A. FIG. 10 is a block diagram of an example network setup 1000 based on a universal communication protocol system from compatible devices using the architecture 500 in FIG. 5. In this example, the network includes a receiver 1010 that may include an LED indicator, a receiver 1012 that may include a buzzer, a transmitter 1014 that includes push button controls, and a motion sensor transmitter 1016 that includes a motion sensor. Each of the devices 1010, 1012, 1014, and 1016 are paired with each other via through factory configuration of the serial pairing bytes in the devices 1010, 1012, 1014, and 1016 which accompany the transmitted messages for each corresponding transceiver. The reference design message format includes a two-byte serialized pairing value which acts as a matching hash for messages. Devices receiving messages which coincide with the factory configured matching value in these two bytes will take the corresponding responsive action to the message received, while other devices will ignore those messages. In this example, any of the devices 1010, 1012, 1014, and 1016 may act as a signal relay to transmit signals for devices that may be out of range. For example, the receiver 1010 may act as a relay to transmit a signal from the receiver 1012 to the transmitter 1016, when the transmitter 1016 is beyond the range of the transmissions from the receiver 1012. The communications between devices may include control commands that activate various functions on the devices 1010, 1012, 1014, and 1016. The communications between devices may include data gathered by the devices 1010, 1012, 1014, and 1016, or relayed commands.

FIG. 11 shows a flow diagram for the setup and activation routine for a pathfinding system using the transmitter 200 in FIG. 2A and multiple receiver beacons such as the receiver beacon 100 in FIG. 1A. The flow diagram in FIG. 11 is representative of an example routine implementable by machine-readable instructions for the transmitter 200 and the receiver beacon 100. In this example, the machine-readable instructions comprise an algorithm for execution by (a) a processor; (b) a controller; and/or (c) one or more other suitable processing device(s). The algorithm may be embodied in software stored on tangible media such as flash memory, CD-ROM, floppy disk, hard drive, solid-state drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application-specific integrated circuit (ASIC), a programmable logic device (PLD), a field-programmable logic device (FPLD), a field-programmable gate array (FPGA), discrete logic, etc.). For example, any or all of the components of the interfaces can be implemented by software, hardware, and/or firmware. Also, some or all of the machine-readable instructions represented by the flowcharts may be implemented manually. Further, although the example algorithm is described with reference to the flowchart illustrated in FIG. 11, persons of ordinary skill in the art will readily appreciate that many other methods of implementing the example machine-readable instructions may alternatively be used. For example, the order of execution of the blocks may be changed, and/or some of the blocks described may be changed, eliminated, or combined.

The receiver beacon 100 is first paired with the transmitter 200 (1100). The transmitter 200 or an external device such as a mobile computing device may assign a sequence number to the receiver beacon 100 (1102). The sequence number may be assigned in advance such as in the factory, or as the receiver beacon 100 is placed on the desired path. Ideally, the sequence numbers should follow the linear order of the receiver beacon 100 on the desired path. The transmitter 200 then assigns the receiver beacon 100 to a network based on the communication protocol with other paired devices such as other receiver beacons 100 (1104).

The transmitter 200 receives a user input to activate the receiver beacon 100 (1106). The transmitter 200 then sends a signal to the receiver beacon 100 (1108). Once the signal is received, the controller of the receiver beacon 100 will activate the location indicator such as the LEDs 136 and 138 (1110). The activation may include strobing the LEDs for a predetermined period of time. The controller of the receiver beacon 100 will also relay the activation command to the next receiver beacon in the sequence (1112). In this example, the relay function is controlled in by a time to live (TTL) byte in the message format, which is decremented for each retransmission. Transmission of a message with a zero value in the TTL byte results in no retransmission by the recipient receiver beacon. The relayed command will cause the receiver beacons that receive the command to also activate the LEDs, thus providing indicators of the path.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A remotely activated receiver beacon comprising:
   a transceiver receiving and sending signals to other devices via a wireless network, the wireless network including the receiver beacon and a transmitter paired with the receiver beacon sending a command signal, wherein the wireless network is created by the transmitter;
   an indicator that when activated indicates the location of the receiver beacon;
   a controller coupled to the indicator and the transceiver, the controller operable to receive a command signal to activate the indicator, and cause the transceiver to relay the command signal to another receiver beacon via the wireless network, wherein the another receiver beacon is paired with the transmitter.

2. The receiver beacon of claim 1, wherein the indicator is a LED.

3. The receiver beacon of claim 2, wherein the controller is operable to strobe the LED for a pre-determined time period when the command signal is received.

4. The receiver beacon of claim 2, wherein the LED emits light in an emission band between wide band visible light to 940 nm infrared.

5. The receiver beacon of claim 1, wherein the controller is operable to pair the receiver beacon with a transmitter, wherein the command signal is received from the paired transmitter.

6. The receiver beacon of claim 1, wherein the transceiver is a Bluetooth receiver.

7. The receiver beacon of claim 6, wherein the command signal is received from a mobile computing device.

8. The receiver beacon of claim 1, further comprising a housing enclosing the transceiver, controller and indicator in an interior of the housing, wherein the housing includes a transparent faceplate allowing light emission from the indicator.

9. The receiver beacon of claim 1, wherein the received and transmitted signals are encrypted.

10. The receiver beacon of claim 1, wherein the signals are infrared signals.

11. A path finding system comprising:
    a plurality of receiver beacons, each of the receiver beacons including:
      a transceiver receiving and sending signals;
      an indicator that when activated indicates the location of the receiver beacon;
      a controller coupled to the indicator and the transceiver, the controller operable to receive an activation signal to activate the indicator; and
    a transmitter paired with each of the plurality of receiver beacons, the transmitter including a transceiver to send an activation signal to at least one of the receiver beacons via a wireless network created by the transmitter, wherein the wireless network includes the transmitter and the plurality of receiver beacons, wherein the at least one receiver beacon receives the activation signal, activates the indicator, and relays the activation signal to at least another receiver beacon.

12. The system of claim 11, wherein the transmitter includes a user input to send the activation signal.

13. The system of claim 11, wherein the indicator is a LED.

14. The system of claim 13, wherein the controller of the receiver beacon is operable to strobe the LED for a predetermined time period when the activation signal is received.

15. The system of claim 13, wherein the LED emits light in an emission band between wide band visible light to 940 nm infrared.

16. The system of claim 11, wherein the transceiver of the receiver beacon is a Bluetooth receiver.

17. The system of claim 11, further comprising a mobile computing device, wherein the mobile computing device is operable to send an activation signal to at least one of the plurality of receiver beacons.

18. The system of claim 11, wherein each of the receiver beacons include a housing enclosing the transceiver, controller and indicator in an interior of the housing, wherein the housing includes a transparent faceplate allowing light emission from the indicator.

19. The receiver beacon of claim 11, further comprising a temperature compensated crystal oscillator coupled to the transceiver of the transmitter.

20. A method of path finding comprising:
pairing a transmitter to each of a plurality of receiver beacons placed along a path, each of the receiver beacons including a transceiver receiving and sending signals; an indicator that when activated indicates the location of the receiver beacon; and a controller coupled to the indicator and the transceiver;
creating a wireless network between each of the plurality of receiver beacons and the transmitter;
transmitting an activation signal from the transmitter to one of plurality of receiver beacons via the wireless network;
receiving the activation signal at the one of the plurality of receiver beacons;
activating the indicator via the controller of the one of the plurality of receiver beacons; and
relaying the activation signal to at least another one of the plurality of receiver beacons.

* * * * *